Patented Apr. 16, 1935

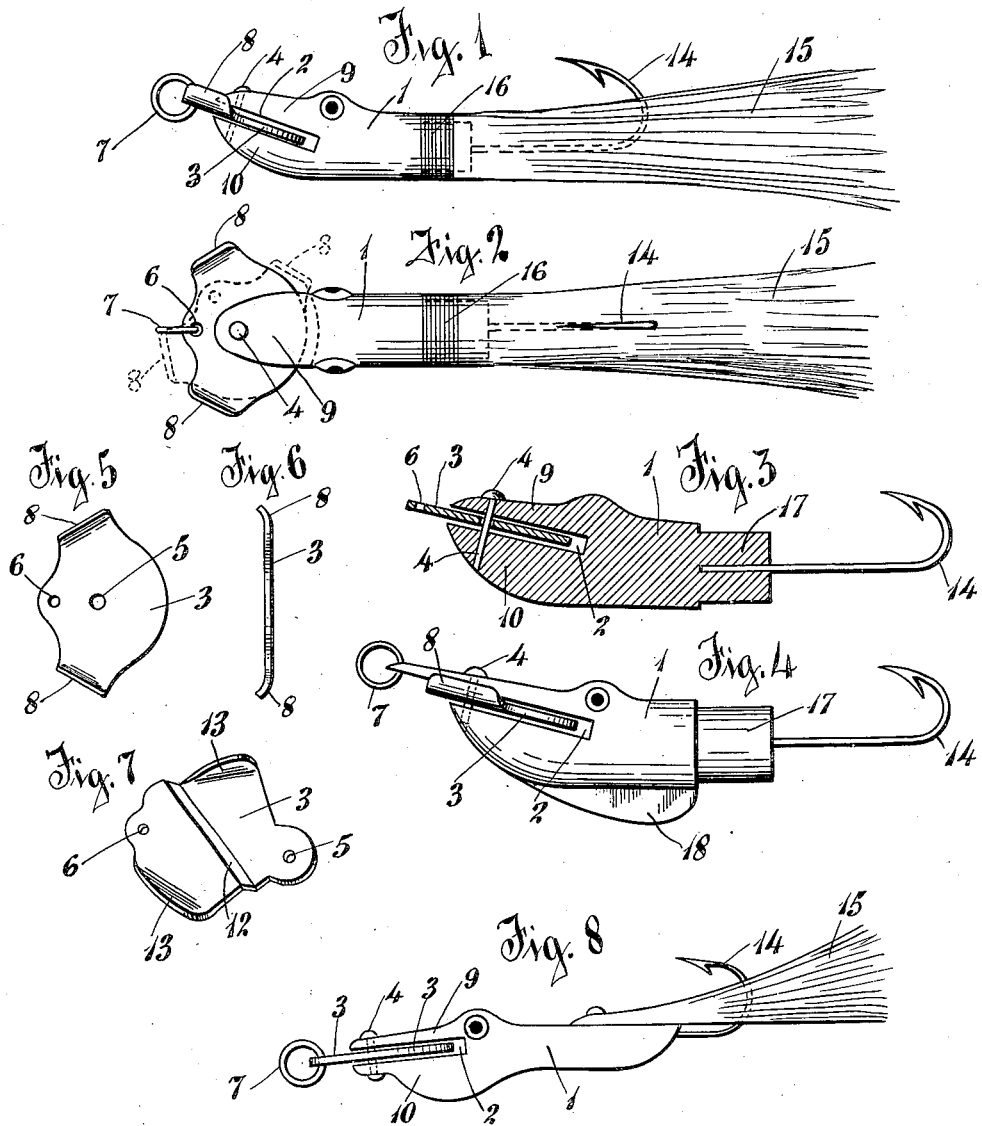

1,997,900

UNITED STATES PATENT OFFICE 1,997,900

ARTIFICIAL BAIT

Ralph Waldo Edwards, Cincinnati, Ohio

Application April 6, 1934, Serial No. 719,312

10 Claims. (Cl. 43—42)

My invention relates to improvements in artificial bait and has for its object to attract fish more readily by a multiplicity of varied motions or actions while being drawn through the water.

It has been found by actual experience that a substantially flat tongue, vane or blade pivotally mounted in a horizontal plane, or nearly horizontal at the front end of the bait, and being limited in its movement in that horizontal plane, constitutes a more successful lure than a stationary rigidly mounted wing or wings or devices such as have heretofore been on the market.

It is a further object of my invention to provide an artificial bait which while being maintained in a substantially upright position at all times, is controlled as to the depth it will maintain itself in the water and one in which by means of the construction of a tongue or vane pivoted at the front end of the bait and movable laterally with relation to the body will cause the entire bait to move in a variety of directions, keeping substantially in an upright position relative to its longitudinal axis.

In the accompanying drawing:—

Fig. 1 is a side elevation of my invention in its preferred form.

Fig. 2 is a plan view of same.

Fig. 3 is a longitudinal cross section of my invention.

Fig. 4 shows a modified form of my invention showing the line fastened directly to the body, and a fin or keel provided on the bottom of the body portion.

Fig. 5 shows a plan view of the tongue, vane or plate employed in my invention.

Fig. 6 shows a side elevation view of the tongue, vane or plate.

Fig. 7 shows a modified form of the tongue employed in the construction shown in Fig. 4.

Fig. 8 shows still another modification showing the tongue mounted in a downwardly inclined horizontal plane.

Referring more specifically to the drawing, 1 refers to the body of the bait in which a horizontal slot 2 is provided at the front part thereof cut crosswise and preferably at a slight incline either upwardly or downwardly according to the depth it is desired to maintain the bait in the water. A tongue, vane or plate 3 is pivotally mounted in the slot by the pin 4 or other suitable means. This tongue 3 extends forwardly and is provided with a hole 5 through which the pivot pin 4 passes and also a hole 6 to which the fishing line is connected either by means of the ring 7 or other suitable connecting means.

The distance the hole 6 is situated from the pivotal point 4 will, it will be readily seen, determine the violence to a degree of the laterally swinging movement of the body and tongue with relation to each other.

It will be obvious from the construction so far described that when the bait is drawn through the water that the pressure of the water against the inclined tongue causes the entire bait to rock or wobble on its longitudinal axis, the rocking action then imparting to the pivoted tongue or vane 3 an oscillating action and the shift of position of the tongue from side to side, shown in dotted lines in Fig. 3 which position is limited by the extending sides or ears 8 striking the body at the sides of the slot 2, transmits to the entire bait a multiplicity of varied movements. The flared sides or ears 8 are slightly turned upwardly or downwardly, which it is found assists in stabilizing the body in a horizontal position, or, one of these ears may be turned upwardly and the other downwardly, which arrangement, it has been found, causes a more pronounced rocking motion.

The slot 2 divides the body at its forward end into upper and lower jaws 9 and 10 respectively and provides substantially flat bearing surfaces between which the tongue 3 moves and is confined, so it can move from side to side only. While it is believed that the slot construction is the most economical and efficient method of controlling the tongue's action in a lateral plane, other constructions might be suggested whereby the tongue is pivoted without the actual slot in the head of the body portion 1. The tongue's surfaces bear against the bearing surfaces of the slot 2, thereby confining the oscillatory movements of each to a correlated plane.

The design of the body 1 is such that the pivotal point of the tongue 3 is above the longitudinal axis of the bait body. This construction allows the heavier portion of the bait to reside below said pivotal point which assists to stabilize the entire bait in a substantially upright natural position. A further means of stabilizing the bait may be provided such as the fin or keel 18 extending from the lower portion of the body shown in Fig. 4.

The pin 4 may be removable to facilitate the interchanging of tongues of different design to somewhat alter the action of the lure.

While only two body designs are shown it will be understood that other shapes and sizes may be employed to represent insects and mammals.

In Fig. 4 the upper jaw 9 is slightly extended and the ring 7 is fastened to this jaw instead of directly to the tongue or vane 3, the tongue 3 being allowed to assume its various positions freely without a direct connection with the fishing line.

In Fig. 7 the modified form of tongue is provided with an offset 12 running across its surface obliquely, and on either side are provided flared portions or ears 13 similar to and for the same purpose as the ears 8. Many designs of tongues will suggest themselves and will no doubt cause as many different resulting actions to the lure, but it is believed that the ones shown will produce the best and most successful results for the greatest majority of fishermen.

The hook 14 may be fastened to the body 1 in any suitable manner, preferably as shown and being somewhat concealed by the camouflage of feathers 15 or other suitable material which constitutes the tail of the lure, which are fastened to the body by means of the cord wrapping 16. The body portion 1 is provided with an extended portion 17 somewhat smaller than the body around which the feathers or camouflage is placed and wrapped with the cord 16 flush with the surface of the body to provide a slim neat appearing whole.

Many other modifications of my invention might be made without departing from its spirit and scope and I do not wish to be confined to the exact details shown.

Having thus described my invention what I claim as new and desire to secure by Letters Patent is as follows.

1. In a fishing lure, a body portion, a hook attached thereto and a slot provided at the forward end thereof, said slot being situated crosswise of said body and open at its forward end, a tongue pivotally secured within said slot, movable laterally in relation to said body, and means for limiting the lateral movement of said tongue relative to said body.

2. In a fishing lure, a body portion, a hook attached thereto said body having a slot crosswise of its forward end in an inclined plane dividing the forward end of said body into upper and lower jaws between which a substantially flat tongue is freely pivoted so as to swing in said slot and on said pivot when the line is being drawn through the water, said tongue having flared sides slightly turned at their outward extremities to contact the sides of the body portion.

3. A fishing lure comprising a body portion, a hook fastened thereto, a tongue mounted at the forward end of said body in such a manner as to oscillate in a substantially inclined plane when the lure is drawn through the water, and means for limiting and confining said oscillation of said tongue.

4. In a fishing lure, a body portion, a tongue pivotally secured thereto and adapted to oscillate in an inclined plane relative to the body portion when the lure is drawn through the water, and means whereby the movements of said tongue and body are confined substantially in said inclined plane.

5. In a fishing lure, a body portion, a tongue pivotally secured thereto in such a manner as to oscillate when the lure is drawn through the water, and means whereby the movement of said tongue is substantially limited in an inclined plane with relation to the body portion.

6. In a fishing lure, a body portion, a tongue pivotally secured to the front part of said body portion, whereby the said tongue is allowed to oscillate in an inclined plane relative to the body portion when the lure is drawn through the water, said tongue being wide enough to extend outwardly beyond the sides of said body and means whereby the movement of said tongue is substantially limited to an inclined plane with relation to the body portion.

7. In a fishing lure, a tongue freely pivoted thereto, and adapted to oscillate in an inclined plane when the lure is drawn through the water, and means whereby the free movement of said tongue is confined to a plane inclined to the body portion.

8. In a fishing lure, a body portion having upper and lower jaws at its forward end, and a tongue freely pivoted between said jaws, whereby the tongue may move in an inclined plane with relation to the body portion, while the lure is being drawn through the water.

9. In a fishing lure, a body portion, a tongue pivotally mounted at the forward part of said body and adapted to oscillate in an inclined plane relative to the body portion while being drawn through the water, said tongue having flared portions or ears at its sides to limit its lateral movement.

10. A fishing lure comprising a body portion, a tongue pivoted at the forward end thereof, whereby the tongue and body are allowed to freely oscillate while the lure is being drawn through the water, said body and tongue having contacting bearing surfaces which substantially confine the said oscillatory motion of said body and tongue to the same, correlated plane.

RALPH WALDO EDWARDS.